Dec. 6, 1955          C. PONS          2,726,052
FISHING REEL
Filed Jan. 5, 1953
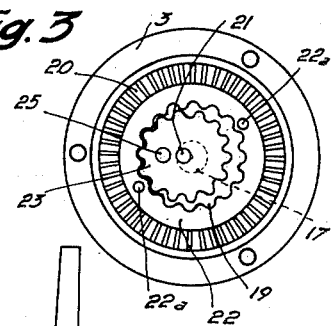
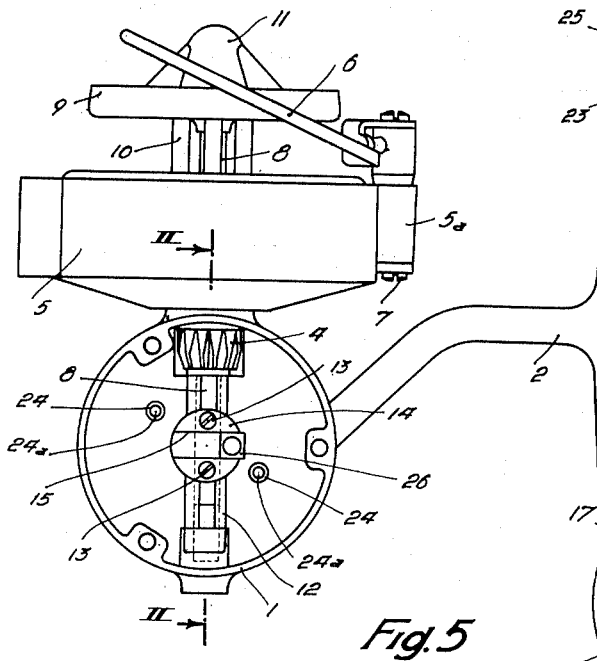
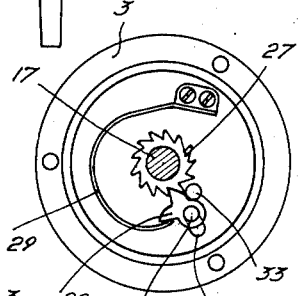
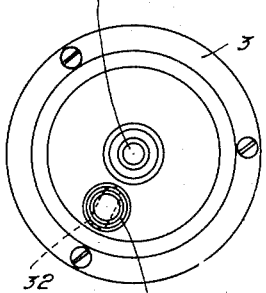
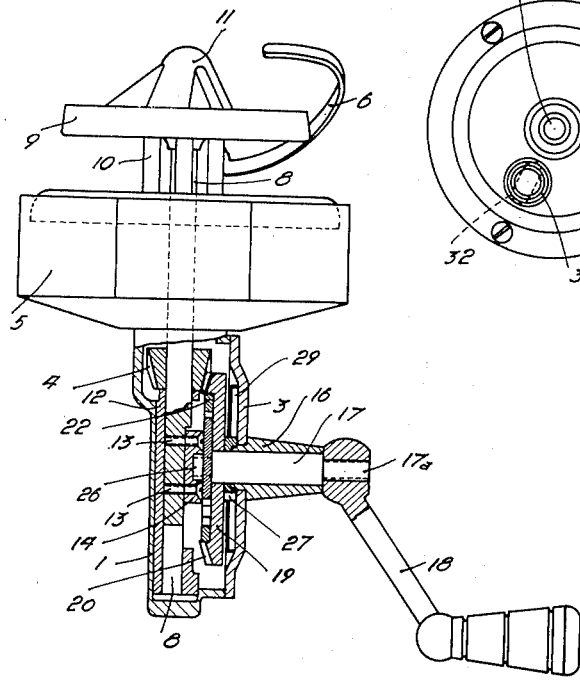
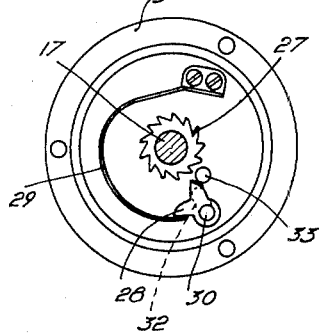
Inventor:
Charles Pons
By his attorneys:
Baldwin & Wight

United States Patent Office 2,726,052
Patented Dec. 6, 1955

2,726,052

FISHING REEL

Charles Pons, Cluses, France, assignor to Etablissements Carpano & Pons, Cluses, France, a corporation of France Application January 5, 1953, Serial No. 329,608

Claims priority, application France December 19, 1952

5 Claims. (Cl. 242—84.4)

The present invention concerns improvements in fishing reels with a fixed drum.

It is known that reels of this type comprise a mechanism driven by means of a crank and which rotatably drives a housing carrying a line-guide, also called a pick-up, and also reciprocates a non-rotatable drum with respect to the housing and line-guide.

The two simultaneous motions are obtainable in various manners.

In one form, an axle driven by the crank drives a gear or a wheel having a helical set of teeth which effects the rotation of the housing and pick-up around the drum. A control member makes it possible to simultaneously obtain the longitudinal reciprocating driving of said drum. This control member preferably comprises a crankpin on a plate carrying the gear or the helical wheel. A connecting rod connects the crankpin with the drum.

In another form, the crankpin engages a groove provided in a slide block associated with the drum.

These devices ensure a perfect synchronism between the rotating motion of the housing and the reciprocating motion of the drum, but one turn of the crank corresponds to a complete rectilinear back and forth motion of the drum.

It is advantageous to obtain a reciprocating motion of the drum which is slower than the rotating motion of the housing.

In known reel constructions, a reduction gear system for reducing the speed of reciprocation of the drum as related to the speed of rotation of the housing is interposed between the crank axle and the controlling member.

The main object of the present invention is to provide a reel in which said speed reduction, obtained heretofore by means of normal fixed axis gears, is attained by means of a hypocycloidal planetary train, imparting to the reciprocating motion transmitted to the fixed drum a very special character. The fairly slow reciprocating motion of the drum, thus obtained, provides a very good distribution of the line as the numerous partial returns cause multiple crossings of the line turns, which are very favourable.

One of the essential features of the invention thus resides in that the driving mechanism comprises, as a speed reducing means inserted between the axle of the crank and the control member for the rectilinear reciprocating motion, a planetary gear train so arranged that the crankpin driving the drum goes through a shortened hypocycloid tracing a number of cusps which depends on the number of teeth in the pinions constituting the planetary train, and on the excentricity of the axle of the inner pinion with respect to the center of the axle of the crank.

The planetary gear train is constituted by a ring type gear with an inner set of teeth mounted in the casing of the mechanism, and inside which a pinion may roll, the number of teeth of which is less than that of the set of teeth in the ring gear, the pinion rotating about an axle or journal placed at the end of the shaft of the crank and eccentric with respect to the shaft, a driving crankpin for the fixed drum being secured on the pinion.

In one embodiment, the planetary gear train is housed inside a cup shaped bevel gear operable to rotate the housing and line guide, the bevel gear being fast on the end of the shaft of the crank.

The driving crankpin for the fixed drum may act on a part associated with the sliding shaft carrying the drum by means of a slide block in which the crankpin is inserted and a slide provided in said part and in which the slide block can slide, the slide being oriented at right angles to the axis of the sliding shaft carrying the fixed drum.

The sliding shaft carrying the fixed drum extends through a hollow conical pinion connected to the housing carrying the line-guide, the shaft and pinion being freely rotatable with respect to each other. The hollow conical pinion meshes with the set of teeth of the bevel gear driven directly by the shaft of the crank.

A ratchet associated with the shaft of the crank and a pawl mounted on an axle carried by the cover of the casing of the mechanism makes it possible to provide a single direction of rotation for said shaft.

The axle of the pawl is carried by a knob which extends through an elongated hole provided in the cover of the casing of the mechanism so as to make it possible, when the knob is caused to slide, to move the pawl away from the wheels of the ratchet and to allow the rotation of the shaft of the crank in two directions.

Various other features will appear from the following description with reference to the appended drawing, wherein:

Fig. 1 is a view in front elevation of a reel made according to the invention, the cover carrying the planetary gear train being removed;

Fig. 2 is a section along line II—II of Fig. 1;

Fig. 3 shows the cover provided with the planetary train.

Fig. 4 shows the cover without the planetary train.

Fig. 5 shows the cover as seen from the outside, the crank being unscrewed.

Fig. 6 shows the cover without the planetary train, a pawl being in its inactive position.

In one form of the invention, mentioned by way of example and not limitative in any way, the reel which is the object of the invention is constructed as follows:

A casing 1, preferably made of light alloy, is provided with an arm 2 adapted to be secured on the fishing rod (Fig. 1).

The casing 1 is provided with bosses in which can be screwed the screws for securing a cover 3 (Figs. 2 and 3).

The upper portion of the casing 1 is provided with a boss integral therewith, in which is mounted, through a ball bearing, not shown, a hollow conical pinion 4 connected to the cylindrical housing 5 carrying a line guide or pick-up 6, of known type.

The pick-up 6 is mounted on a shaft 7 carried by a boss 5a of the housing 5 and can, in any known manner, be placed in an active or in a passive position.

Extending through the hollow conical pinion 4 is a shaft 8 at the upper end of which is mounted a drum 9 comprising two flanges connected together by pillars 10 or in any other suitable manner.

The drum 9 is secured on the shaft 8 by means of a screw associated with a knob 11 making it possible to adjust the pressure of a conventional friction device, not shown, which acts as a brake on the drum. Rotation of the drum in the one direction relative to the shaft is prevented by a ratchet associated with the shaft and a pawl mounted on the drum the ratchet and pawl being of known construction and not shown in the drawing.

All these members are of common types and do not in themselves constitute the present invention.

The shaft 8 is housed in a tubular guide 12 mounted in the casing 1 and can slide therein.

On a flat part of the shaft 8 there is secured, by means of two screws 13, a part 14 provided with a slide 15 the axis of which is perpendicular to that of the shaft 8.

The tubular guide 12 is suitably milled or slotted for allowing the free reciprocating motion of the part 14 corresponding to that imparted to the drum 9 carried by the shaft 8.

On the cover 3 (Fig. 2) there is a bushing 16 serving as a bearing for a shaft 17 the threaded portion 17a of which receives a crank 18.

The shaft 17 is connected to a cup shaped plate 19 having at its periphery a bevel gear 20 for meshing with the hollow conical pinion 4 connected to the housing 5.

The end of the shaft 17 is provided with a small axle 21, off-center with respect to the shaft.

Located within the cup shaped plate 19 is a ring type gear 22 having an inner set of teeth. The set of teeth of the gear 22 meshes with a flat planetary pinion 23 journaled for rotation on the axle 21.

In the example represented, the gear 22 is provided with 16 teeth while pinion 23 comprises only fourteen.

The pinion 23 can roll inside the ring gear 22, and the unit thus constitutes a hypocycloidal or planetary gear train making it possible to transform the rotating motion supplied by the plate 19 into a rectilinear reciprocating motion having a novel and advantageous relation to the rotation of the housing 5 and pick-up 6.

The ring gear 22 may be provided with two holes 22a, which may be engaged by two studs 24a, placed at the ends of the pillars 24 secured in the bottom of the casing 1.

The ring gear 22 is thus, when mounted, immobilized, since it is fast with the casing.

The pinion 23 is provided with a crank pin 25 engaging a slide block 26 mounted to slide in the slide 15 of the part 14.

On the shaft 17, against the face of the plate 19 opposite that which carries the set of teeth 20, a ratchet 17 is mounted for cooperation with a pawl 28 mounted on the cover 3. A spring 29 secured on said cover acts constantly on the pawl 28.

The pawl is mounted on a pivot 30 carried by a knob 31 (Fig. 5) extending through an elongated hole 32 provided in the cover 3. By sliding knob 31, one may either bring the pawl 28 in gear with the teeth of the ratchet 27, or, on the contrary, disengage it from said teeth by placing it in the position shown in Fig. 6, in engagement with a stud 33 attached to the cover, making it possible to lock the pawl in one or the other of the two positions.

This arrangement makes it possible either to prevent any reverse motion of the crank and consequently any reverse rotation of the pick-up or to enable reverse rotation of the crank and pick-up for effecting a recovery of the line.

The operation of the device is extremely simple.

The rotation of the crank 18 causes rotation of the plate 19 and its bevel gear 20 which acts on the conical pinion 4 which drives the housing 5 with which it is associated as well as the pick-up 6 carried by the housing.

Simultaneously, pinion 23, driven orbitally in rotation by the axle 21 about the axis of shaft 17 rolls inside the stationary gear 22 and its crank pin 25, through the slide block 26 and part 24, reciprocates the shaft 8 which slides in the tubular guide 12. The drum 9 then follows this motion, the rate of which depends, on the one hand, on the ratio existing between the number of teeth of the crown 22 and of the pinion 23 and, on the other hand, on the excentricity of the axle 21 with respect to the center of the shaft 17.

In the example shown, the gear 22 comprises sixteen teeth and the pinion 23, fourteen teeth. It is thus known that due to this difference of two teeth, the reduction or demultiplication ratio will be:

$$\frac{14}{2}=7$$

It may thus be seen that as the eccentric axle 21, fast with the plate 19 effects rotation of the pinion 23 inside the gear 22, seven turns of the shaft 17 will be necessary for obtaining one turn of the pinion 23 and consequently of the crank pin 25 which controls the reciprocating motion as just explained above.

It should be noted that for each rotation of the shaft 17 and eccentric journal 21, the crank pin 25 describes a shortened hypocycloid with seven cusps. In this manner the crank pin 25, for one turn of shaft 17 effectuates seven partial returns of the drum 9. These successive partial returns give the rectilinear motion of the fixed drum a very special aspect.

The fairly slow overall reciprocating motion of the drum ensures a very good distribution of the line while the multiple partial returns cause numerous crossings in the turns of the line, which are very favourable.

It is obvious that other arrangements might be adopted and that the planetary train could be placed at any other point on the reel. It should be noted, however, that the arrangement of the planetary train inside the gear 20 ensures a great simplicity of construction.

What I claim is:

1. In a fishing reel, a housing; a line guide carried by said housing; a drum for receiving the line; a shaft slidable in said housing and carrying said drum; driving mechanism for rotating said housing and reciprocating said shaft, said driving mechanism comprising a planetary gear train having a first gear, means fixing said first gear against rotation, a second gear meshing with said first gear, a journal for supporting said second gear, means for supporting said journal for rotation in an orbit, and a crank pin device interposed between and connected to said second gear and to said slidable shaft for imparting a rectilinear reciprocating motion to said shaft simultaneously with the rotation of said housing; and means for actuating said driving mechanism.

2. In a fishing reel; a housing; a line guide carried by said housing; a drum for receiving the line; a shaft slidable in said housing and carrying said drum; driving mechanism for rotating said housing and reciprocating said shaft, said driving mechanism including a hypocycloidal planetary gear train comprising a first gear having an inner set of teeth, means fixing said first gear against rotation, a pinion having an outer set of teeth rolling in mesh with the teeth of said first gear, a shaft mounting said pinion eccentrically to said first gear, a crank pin carried by said pinion and having an operative connection with said slidable shaft for imparting a rectilinear reciprocating motion to said shaft; and means for actuating said driving mechanism.

3. In a fishing reel; a housing; a line guide carried by said housing; a drum for receiving the line; a shaft slidable in said housing and carrying said drum; a slide block mounted on said shaft; driving mechanism for rotating said housing and reciprocating said shaft, said driving mechanism including a hypocycloidal planetary gear train comprising a first gear having an inner set of teeth, means fixing said first gear against rotation a pinion having an outer set of teeth rolling in mesh with the teeth of said first gear, a shaft mounting said pinion eccentrically to said first gear, a crank pin carried by said pinion and having an operative connection with said slide block carried by said slidable shaft for imparting a rectilinear reciprocating motion to said shaft; and means for actuating said driving mechanism.

4. In a fishing reel; a housing; a line guide carried by said housing; a drum for receiving the line; a shaft slidable in said housing and carrying said drum; driving mechanism for rotating said housing and reciprocating said shaft, said driving mechanism including a hypocycloidal planetary gear train comprising a ring gear having an inner set of teeth, means fixing said ring gear against rotation, a pinion having an outer set of teeth rolling in mesh with the teeth of said ring gear, a shaft mounting said pinion eccentrically to said ring gear, a crank pin carried by said pinion and having an operaitve connection with said slidable shaft for imparting a rectilinear reciprocating motion to said shaft; and means for actuating said driving mechanism, said actuating means driving a first gear fast on said pinion mounting shaft and a second gear meshing with said first gear, said second gear being loosely mounted on said slidable shaft and connected to said housing.

5. In a fishing reel; a casing; a housing rotatably mounted on said casing; a line guide carried by said housing; a drum for receiving the line; a shaft slidable in said housing and in said casing and carrying said drum; a slide-block mounted on said shaft; and driving mechanism for rotating said housing and reciprocating said shaft, said driving mechanism being supported within said casing and including a crank shaft journalled in said casing perpendicular to said slidable shaft, a first gear secured to said crank shaft, a second gear connected to said housing and meshing with said first gear for rotating said housing, a hypocycloidal planetary gear train comprising a ring gear having an inner set of teeth and being mounted fast with said casing coaxially with said crank shaft, a pinion having an outer set of teeth rolling in mesh with the teeth of said ring gear, a journal carried by said crank shaft and mounting said pinion eccentrically to said ring gear, and a crank pin carried by said pinion and having an operative connection with said slide block carried by said slidable shaft for imparting a rectilinear recpirocating motion to said shaft simultaneously with the rotation of said housing.

References Cited in the file of this patent
UNITED STATES PATENTS

| | | |
|---|---|---|
| 2,546,465 | Martini | Mar. 27, 1951 |
| 2,613,882 | Small | Oct. 14, 1952 |
| 2,641,419 | Cowan et al. | June 9, 1953 |

FOREIGN PATENTS

| | | |
|---|---|---|
| 55,542 | France | Mar. 14, 1952 |
| 969,584 | France | Mar. 24, 1950 |
| 603,605 | Great Britain | June 18, 1948 |